(12) United States Patent
Moll et al.

(10) Patent No.: US 7,797,563 B1
(45) Date of Patent: Sep. 14, 2010

(54) SYSTEM AND METHOD FOR CONSERVING POWER

(75) Inventors: Laurent R. Moll, Santa Clara, CA (US); Joseph Rowlands, Santa Clara, CA (US)

(73) Assignee: Oracle America, Redwood City, CA (US)

(*) Notice: Subject to any disclaimer, the term of this patent is extended or adjusted under 35 U.S.C. 154(b) by 951 days.

(21) Appl. No.: 11/450,103

(22) Filed: Jun. 9, 2006

(51) Int. Cl.
*G06F 1/00* (2006.01)
(52) U.S. Cl. .................................. 713/324; 713/320
(58) Field of Classification Search .............. 713/320, 713/324
See application file for complete search history.

(56) References Cited

U.S. PATENT DOCUMENTS

2004/0078527 A1*  4/2004  Tetrick ........................ 711/137
2006/0053326 A1*  3/2006  Naveh et al. ................. 713/323
2006/0136680 A1*  6/2006  Borkenhagen et al. ....... 711/154
2006/0184287 A1*  8/2006  Belady et al. ................ 700/291

* cited by examiner

*Primary Examiner*—Tse Chen
(74) *Attorney, Agent, or Firm*—Osha • Liang LLP

(57) ABSTRACT

A system includes a plurality of processors and a monitor coupled to each of the plurality of processors. The monitor is located in a location separate from the plurality of processors. At least some portions of one or more of the plurality of processors enter a power-conservation mode after the one or more of the plurality of processors request one or more resources. The system further includes a power-management controller. The power-management controller is operative to cause the at least some portions of the one or more of the plurality of processors to enter the power-conservation mode after the one or more of the plurality of processors request the one or more resources.

14 Claims, 4 Drawing Sheets

302 Provide a monitor, wherein the monitor is located in a location separate from the at least one processor.

304 Causing at least some portions of at least one processor to enter a power-conservation mode after the processor requests one or more resources.

FIG. 3

SYSTEM AND METHOD FOR CONSERVING POWER

FIELD OF THE INVENTION

The present invention relates to computer systems, and more particularly to a system and method for conserving power.

BACKGROUND OF THE INVENTION

Power conservation is a well-known objective in many computer system designs. One conventional solution is to use monitor functions to enable a central processing unit (CPU) core to enter a low-power mode in certain circumstances. For example, in multiprocessor systems where multiple CPU cores access interdependent data in a table, only one CPU core is allowed to access and modify the data at a given time. This ensures consistency in the data. Accordingly, while one CPU core accesses the data, the other CPU cores must wait until the CPU core has completed any write operations to the data. After requesting access to the data, a given CPU core enters a low-power mode as an alternative to the CPU core being busy waiting for the data to become available. The CPU core then exits the low-power mode when the data becomes available.

While the CPU core is in a low-power mode, the CPU core must be able to monitor when the data becomes available. Some Intel x86 processors support monitor functions through so-called MONITOR/MWAIT instructions. These instructions provide an address range that can be monitored for each CPU core, and these instructions prompt a given CPU core to exit a low-power mode upon any coherent write to an address within the address range. The CPU cores include monitor logic that utilizes these instructions to monitor their bus interfaces to detect access to the monitored address range. A limitation with conventional solutions is that in the low-power mode, the monitor logic and bus interfaces of a given CPU core both need to remain active in order to continue monitoring. The other portions of the CPU core can enter a low-power mode while waiting for a requested resource in order to conserve power.

Accordingly, what is needed is an improved system and method for conserving power. The present invention addresses such a need.

SUMMARY OF THE INVENTION

A system and method for conserving power is disclosed. In one embodiment, the system includes at least one processor and a monitor coupled to the at least one processor. The monitor is located in a location separate from the at least one processor. At least some portions of the least one processor enter a power-conservation mode after the at least one processor requests one or more resources.

According to the system and method disclosed herein, substantial power conservation is achieved, because more portions of the at least one processor may be shut down while in the power-conservation mode.

BRIEF DESCRIPTION OF THE DRAWINGS

FIG. 3 is a flow chart showing a method for conserving power in accordance with the present invention.

DETAILED DESCRIPTION OF THE INVENTION

The present invention relates to computer systems, and more particularly to a system and method for conserving power. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A system and method in accordance with the present invention for conserving power are disclosed. The system includes multiple processors and a centralized monitor coupled to the processors. A given processor may enter a power-conservation mode after requesting access to one or more resources (e.g., addresses). Because the monitor is located in a location separate from the processors, each of the multiple processors need not have its own dedicated monitor, thereby allowing more portions of a given processor to enter a power-conservation mode. In one embodiment, the processor may be shut down completely while in the power-conservation mode. A power-management controller is operative to cause a given processor to exit the power-conservation mode when the monitor detects that one or more resources requested by the processor become available to the processor. As a result, substantial power savings is achieved. To more particularly describe the features of the present invention, refer now to the following description in conjunction with the accompanying figures.

Although the present invention disclosed herein is described in the context of addresses, the present invention may apply to other types of resources and access functions, and still remain within the spirit and scope of the present invention.

Figure 1:
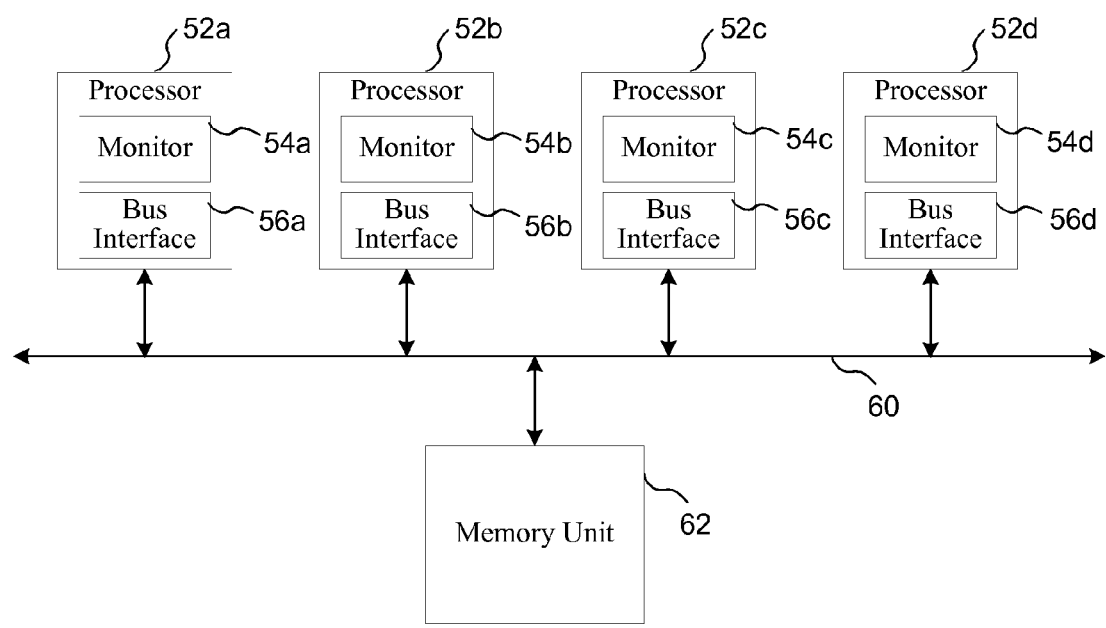
FIG. 1 is a block diagram of a conventional multiprocessor system.

FIG. 1 is a block diagram of a conventional multiprocessor system 50. The system 50 includes multiple processors 52*a*, 52*b*, 52*c*, and 52*d* having respective monitors 54*a*, 54*b*, 54*c*, and 54*d*, and respective bus interfaces 56*a*, 56*b*, 56*c*, and 56*d*. The system 50 also includes a shared bus 60 that couples the processors 52*a*, 52*b*, 52*c*, and 52*d* to a memory unit 62. When a given processor 52 enters a power-conservation mode, the monitors 54 and bus interfaces 56 need to remain on/active in order to perform monitoring operations.

Figure 2:
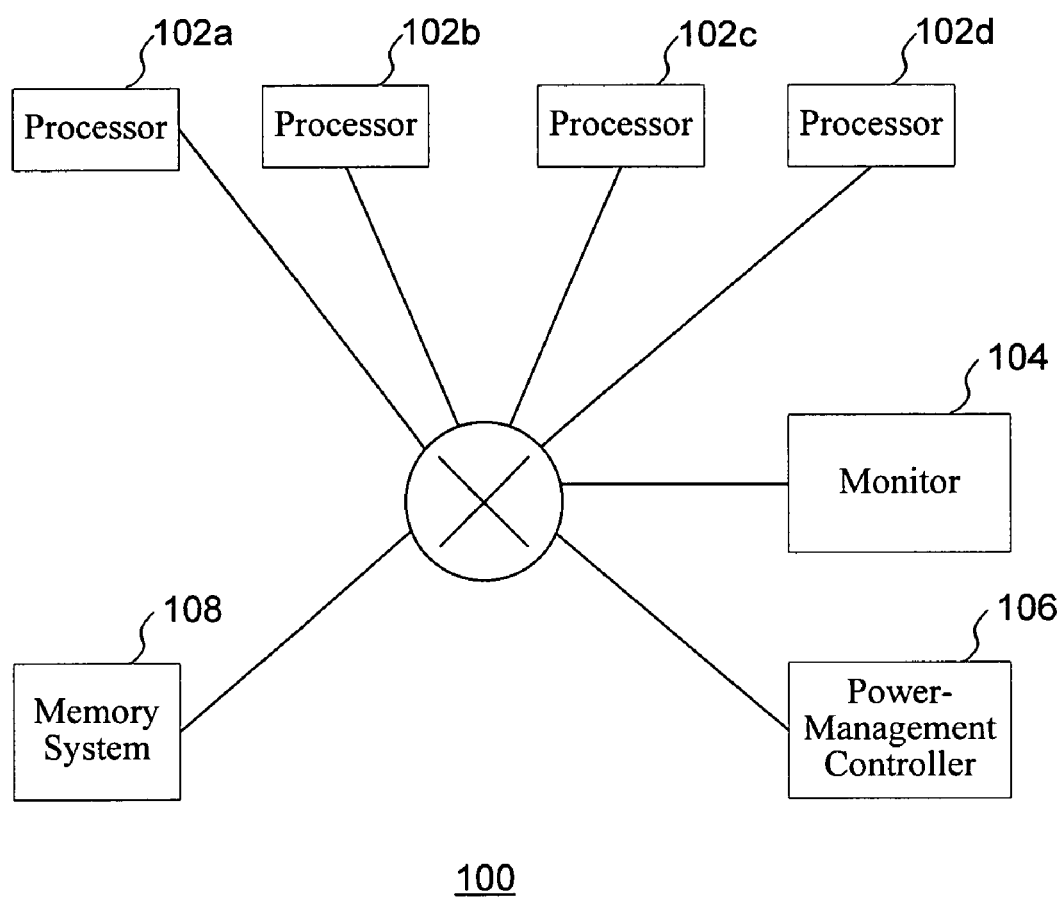
FIG. 2 is a block diagram of a system in accordance with the present invention.

FIG. 2 is a block diagram of a system 100 in accordance with the present invention. In one embodiment, the system 100 is a multiprocessor system including one or more processors 102*a*, 102*b*, 102*c*, and 102*d*, a monitor 104, a power-management controller 106, and a memory system 108. These components 102, 104, 106, and 108 may be integrated on the same chip/die. Alternatively, these components 102-108 may be located on one or more different chips. The power management controller 106 is operative to interact with the processors 102 and to control their power states. In one embodiment, the monitor 104 utilizes logic that is operative to access memory traffic, coherent memory traffic, and/or coherency traffic depending on the monitor functionality. As FIG. 2 illustrates, the monitor 104 is located in a centralized location. In one embodiment, the monitor 104 is located in a location separate from the other components, including the processors 102. As indicated above, the monitor 104 may be integrated on the same chip as the other components, but located separately on the chip. Alternatively, the monitor 104 may be located on a different chip from one or more of the other components. Because the monitor 104 is separate from the processors 102, the processors 102 can independently enter a power-conservation mode (e.g. any low-power mode) or can even be turned off while the monitor 104 remains active. The monitor 104 may alternatively reside in any other suitable centralized location such as in the power-management controller 106 or in the memory system 108. In one embodiment, the functionality of the monitor 104 can reuse existing features of an existing logic block to provide the functionality at very little additional cost. The monitor functionality being in a centralized location results in a more efficient implementation with regard to both power consumption and area savings since each of the processors may be designed without a dedicated monitor.

FIG. 3 is a flow chart showing a method for conserving power in accordance with the present invention. Referring to both FIGS. 2 and 3 together, the process begins in a step 302 where the monitor 104 is provided, where the monitor is located in a central location. As described in more detail below in connection with FIG. 4, one or more processors 102 may enter a power-conservation mode after requesting to be informed of access to one or more respective resources. A resource may be, for example, one or more addresses (or one or more address ranges). In one embodiment, the processors 102 execute instructions to transmit a request for the resources to the monitor 104 to set the monitor 104 and to the power-management controller 106. Next, in a step 304, the power-management controller 106 causes some portions of the one or more processors to enter a power-conservation mode after the processor 102 requests one or more resources. Because monitor 104 is located in the central location separate from the processors 102, more portions of each of the processors 102 may shut down while in a power-conservation mode. For example, because the processors 102 share a single centralized monitor (i.e., the monitor 104), each processor 102 need not have a dedicated monitor, which would remain active while the processor 102 is in the power-conservation mode. Accordingly, any bus interface that a given processor 102 may have, which would otherwise interface with a dedicated monitor, can be shut down completely. In one embodiment, all portions of a given processor 102 may be shut down while in a power-conservation mode. As a result, considerable power savings is achieved.

After a processor 102 sets the monitor 104, the monitor 104 begins monitoring the requested resource. In one embodiment, when the monitor 104 detects that an access (or possibly other action) is performed in connection with the monitored resource (e.g., one or more addresses are accessed), the monitor 104 informs the power-management controller 106. The power-management controller 106 then causes the processor 102 to exit the power-conservation mode. Note that the processor 102 may be forced out of the power-conservation mode by other events (e.g., direct memory access, interrupts, etc.). Once the processor 102 exits the power-conservation mode, the processor 102 may then attempt to access the resource. The discussion below in connection with FIG. 4 provides a more specific implementation where the resource is one or more addresses (or one or more address ranges).

Figure 4:
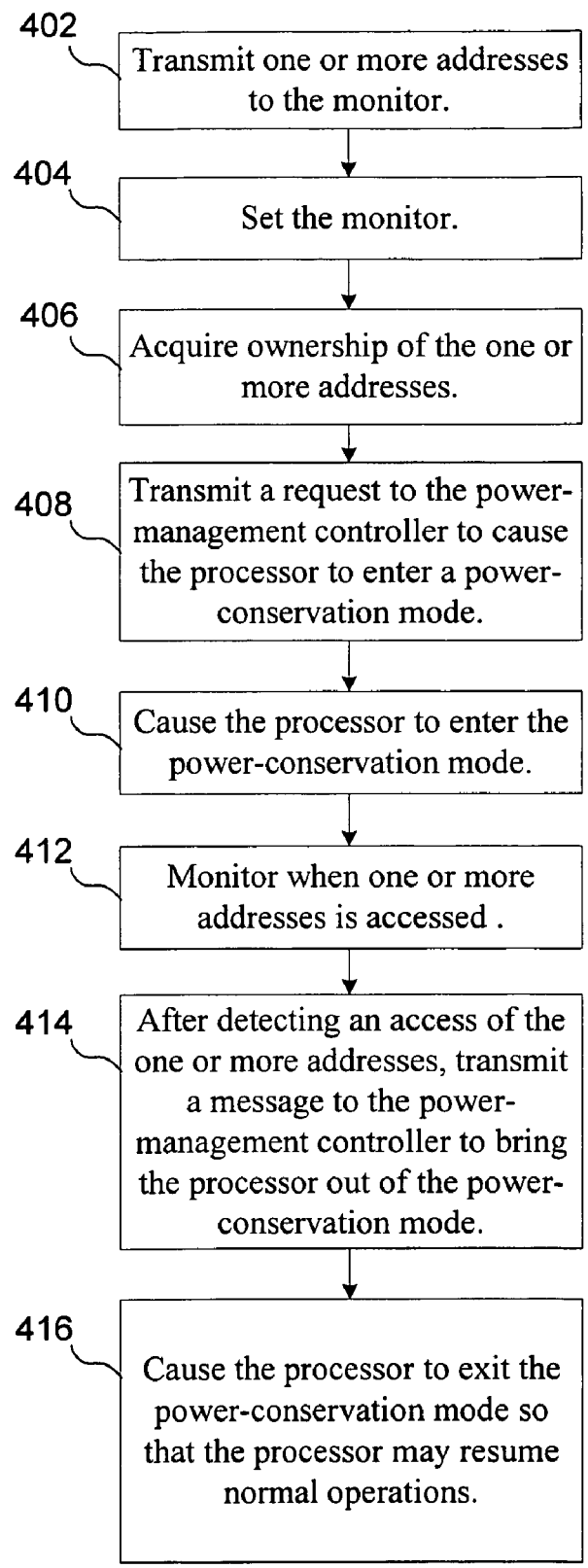
FIG. 4 is a flow chart showing a method for conserving power in accordance with the present invention.

FIG. 4 is a flow chart showing a method for conserving power in accordance with the present invention. Referring to both FIGS. 2 and 4 together, the process begins in a step 402 where one or more of the processors 102 transmits one or more addresses (or one or more address ranges) to the monitor 104. In one embodiment, the request may be a request for write access. Next, in a step 404, the processor 102 sets the monitor 104. In one embodiment, the processor 102 sets the monitor by accessing a register in the monitor 104 and storing an address/range of address in the register. This address/range of address is what the monitor 104 will monitor. Next, in a step 406, in response to the setting of the monitor 104, the monitor 104 acquires or reclaims ownership (in the coherent sense) that another processor may have of the one or more addresses. In one embodiment, the monitor 104 is operable to acquire ownership of the one or more addresses by acquiring ownership of cache lines associated with the one or more addresses. The monitor 104 may own a sufficient number of cache lines to cover the maximum number of addresses or address ranges for all of the processors 102 requesting resources and monitor functionality. When a given processor 102 requests a resource, the monitor 104 acquires ownership of the resources (e.g., address locations) covered by the monitor 104.

In one embodiment, if another processor already has ownership of the one or more addresses with the intent to write to the one or more address, the monitor allows that processor to complete its write operation(s). After that processor has accessed (e.g., written to) the one or more addresses, that processor relinquishes ownership to the monitor 104. As described in more detail below, the monitor 104 monitors the one or more addresses and then reclaims ownership at an appropriate time (i.e., after the one or more addresses have been written to). In one embodiment, the monitor 104 includes a directory that keeps track of the usage of all of the cache lines. The monitor 104 utilizes the directory to determine which element has current ownership of a given cache line. The monitoring described above may be achieved in a number of ways, depending at least in part on the specific functionality of the monitor 104. In one embodiment, the monitor 104 transmits to the memory system 108 a request for the resource. In one embodiment, the processor 102 polls the monitor 104 until the transmission of the request by the monitor 104 is completed. In response to the request, after a write operation to the one or more addresses has been performed, the memory system 108 transmits a message to the monitor 104 indicating as such.

In some implementations, the monitor may employ various protocols to acquire ownership: modified, shared, invalid (MSI); modified, exclusive, shared, invalid (MESI); and modified, owned, exclusive, shared, invalid (MOESI). In one embodiment, the monitor 104 may acquire the ownerships in the shared state. When the processor 102, or a direct memory access (DMA) agent, attempts to acquire ownership of any part of the monitored region with intent to write to it, these protocols enable a coherency mechanism to reclaim the cache line(s) from the monitor 104. The reclaiming of the cache line(s) triggers the monitor 104 to begin monitoring again, as described above. This is an optimal solution to implement monitoring of coherent stores, which is what the x86 MONITOR/MWAIT uses.

In one embodiment, the power-management controller 106 may also acquire ownership of cache lines. The ownership mechanism of one coherent agent may also be shared with the ownership mechanism of another coherent agent in the system, such as a coherent agent dealing with coherent DMA. In one embodiment, the monitoring functionality would take no resources when unused and would subtract some entries in the data structure of the host agent when used. As indicated above, the monitor 104 may reside anywhere in a system, provided it can both participate in the general coherency and own cache lines.

In one embodiment, a centralized coherency resolution unit (CRU) may be utilized for systems having multi-processor (e.g. integrated multi-core chips). The CRU keeps track of all coherent requests. It is easy to add a check for the monitored regions. As in the previous example, the monitor 104 may use existing data structures, such as a table of coherent actions in flight, for a minimum impact on area and complexity. The embodiments described above may be used only to monitor coherent traffic. Monitoring non-coherent traffic requires the co-location of the monitor 104 with the ordering point of the system, through which all non-coherent transactions must go.

Referring still to FIG. 4, in a step 408, the processor 102, or alternatively, the monitor 104, transmits a request to the power-management controller 106 to cause the processor 102 to enter a power-conservation mode. Next, in a step 410, in response to the request, the power-management controller 106 causes the processor 102 to enter the power-conservation mode. As indicated above, some or all portions of the processor 102 may enter the power-conservation mode (i.e., enter a low-power mode or turn off completely). Next, in step 412, the monitor 104 monitors when one or more addresses is accessed (e.g., by one of the processors 102). After the monitor 104 detects an access of the one or more addresses, in a step 414, the monitor 104 transmits a message to the power-management controller 106 to bring the processor 102 out of the power-conservation mode. Next, in a step 416, the power-management controller 106 causes the processor 102 to exit the power-conservation mode so that the processor 102 may resume normal operations.

According to the system and method disclosed herein, the present invention provides numerous benefits. For example, substantial power savings is achieved, because more (or even all) portions of a given processor may be shut down while the processor is in the power-conservation mode. Furthermore, the monitor functionality being in a centralized location results in a more efficient implementation with regard to area savings, since each of the processors may be designed without a dedicated monitor.

A system and method in accordance with the present invention for conserving power has been disclosed. The system includes multiple processors and a centralized monitor coupled to the processors. A given processor may enter a power-conservation mode after requesting access to one or more resources (e.g., addresses). Because the monitor is located in a location separate from the processors, each of the multiple processors need not have its own dedicated monitor, thereby allowing more portions of a given processor to enter a power-conservation mode. In one embodiment, the processor may be shut down completely while in the power-conservation mode. A power-management controller is operative to cause a given processor to exit the power-conservation mode when the monitor detects that one or more resources requested by the processor become available to the processor. As a result, substantial power savings is achieved.

The present invention has been described in accordance with the embodiments shown. One of ordinary skill in the art will readily recognize that there could be variations to the embodiments, and that any variations would be within the spirit and scope of the present invention. For example, the present invention can be implemented using hardware, software, a computer readable medium containing program instructions, or a combination thereof. Software written according to the present invention may be stored in some form of computer-readable medium such as memory or CD-ROM or transmitted over a network to be executed by a processor. Accordingly, many modifications may be made by one of ordinary skill in the art without departing from the spirit and scope of the appended claims.

What is claimed is:

1. A system comprising:
   a plurality of processors;
   a power-management controller; and
   a monitor coupled to and located in a location separate from each of the plurality of processors,
   wherein, when one or more of the plurality of processors send a request to the monitor for one or more resources, the monitor and the power-management controller acquire ownership of the one or more resources and the power-management controller causes at least some portions of the one or more of the plurality of processors to enter a power-conservation mode, and
   wherein, when the one or more resources become available to the one or more of the plurality of processors, the monitor and the power-management controller relinquish ownership of the one or more resources and the power-management controller causes the at least some portions of the one or more of the plurality of processors to exit the power-conservation mode.

2. The system of claim 1, wherein the monitor utilizes logic that is operative to access one or more of memory traffic, coherent memory traffic, and coherency traffic.

3. The system of claim 1, wherein all portions of the one or more of the plurality of processors enter the power-conservation mode.

4. The system of claim 1, wherein the one or more resources comprise one or more addresses.

5. The system of claim 4, wherein the monitor is operative to monitor whether a write operation to the one or more addresses has been performed.

6. A method for conserving power, the method comprising:
   providing a plurality of processors, a power-management controller, and a monitor coupled to and located in a location separate from each of the plurality of processors;
   causing the monitor and the power-management controller to acquire ownership of one or more resources when one or more of the plurality of processors send a request to the monitor for the one or more resources;
   causing at least some portions of the one of more of the plurality of processors to enter a power conservation mode after the monitor and the power-management controller acquire ownership of the one or more resources;
   causing the monitor and the power-management controller to relinquish ownership of the one or more resources when the monitor detects that the one or more resources have become available to the one or more of the plurality of processors; and
   causing the at least some portions of the one or more of the plurality of processors to exit the power-conservation mode after the monitor and the power-management controller relinquish ownership of the one or more resources.

7. The method of claim 6, wherein the one or more resources comprise one or more addresses, and wherein the method further comprises:
   transmitting the one or more addresses to the monitor; and
   setting the monitor.

8. The method of claim 6, wherein the monitor utilizes logic that is operative to access one or more of memory traffic, coherent memory traffic, and coherency traffic.

9. The method of claim 6, wherein all portions of the one or more of the plurality of processors enter the power-conservation mode.

10. The method of claim 6, further comprising monitoring whether a write operation to the one or more addresses has been performed.

11. A computer-readable medium comprising program instructions for causing a computer system to execute a method comprising:

provide a plurality of processors, a power-management controller, and a monitor coupled to and located in a location separate from each of the plurality of processors;

causing the monitor and the power-management controller to acquire ownership of one or more resources when one or more of the plurality of processors send a request to the monitor for the one or more resources;

causing at least some portions of the one or more of the plurality of processors to enter a power conservation mode after the monitor and the power-management controller acquire ownership of the one or more resources;

causing the monitor and the power-management controller to relinquish ownership of the one or more resources when the monitor detects that the one or more resources have become available to the one or more of the plurality of processors; and causing the at least some portions of the one or more of the plurality of processors to exit the power-conservation mode after the monitor and the power-management controller relinquish ownership of the one or more resources.

12. The computer-readable medium of claim 11, wherein the one or more resources comprise one or more addresses, and wherein the method further comprises:

transmitting the one or more resources to the monitor; and setting the monitor.

13. The computer-readable medium of claim 11, wherein the monitor utilizes logic that is operative to access one or more of memory traffic, coherent memory traffic, and coherency traffic.

14. The computer-readable medium of claim 11, further comprising program instructions for monitoring whether a write operation to the one or more addresses has been performed.

* * * * *